United States Patent [19]

Kaneko

[11] 4,271,205

[45] Jun. 2, 1981

[54] METHOD FOR MANUFACTURING QUICKLY COOKABLE DRY AND POROUS NOODLES

[75] Inventor: Yoshio Kaneko, Kofu, Japan

[73] Assignee: Toyo Suisan Kaisha, Ltd., Tokyo, Japan

[21] Appl. No.: 48,008

[22] Filed: Jun. 13, 1979

Related U.S. Application Data

[63] Continuation-in-part of Ser. No. 964,295, Nov. 28, 1978, abandoned.

[30] Foreign Application Priority Data

Dec. 23, 1977 [JP] Japan ................................ 52/155183

[51] Int. Cl.$^3$ ............................................... A23L 1/16
[52] U.S. Cl. ..................................... 426/451; 426/445; 426/465; 426/511; 426/557
[58] Field of Search ............... 426/451, 557, 640, 564, 426/568, 498, 470, 465, 511, 505, 496, 445; 34/12, 13, 35, 26

[56] References Cited

U.S. PATENT DOCUMENTS

| | | | |
|---|---|---|---|
| 2,804,697 | 9/1957 | Coffaro | 34/12 X |
| 2,819,969 | 1/1958 | Grandel | 426/451 |
| 3,172,765 | 3/1965 | Carloni | 426/451 |
| 3,266,559 | 8/1966 | Osborne et al. | 426/470 X |
| 3,663,232 | 5/1972 | Glabe | 426/557 |
| 3,908,029 | 9/1975 | Fredrickson | 426/557 X |
| 4,098,906 | 7/1978 | Hisaki et al. | 426/451 X |

FOREIGN PATENT DOCUMENTS

| | | | |
|---|---|---|---|
| 2745816 | 4/1978 | Fed. Rep. of Germany | 426/451 |
| 52-24576 | 7/1977 | Japan | 426/557 |

OTHER PUBLICATIONS

Hummel; Macaroni Product; 1966; Food Trade Press, Ltd. 7 Garrick St–London W.C.2; pp. 1,2,126,136,139,142,185,186,191,260.

*Primary Examiner*—William F. Smith
*Attorney, Agent, or Firm*—Frishauf, Holtz, Goodman & Woodward

[57] ABSTRACT

A method for manufacturing dry and porous noodles used as a quickly cookable food, which comprises blowing circulatingly superheated water vapor, i.e. superheated steam, at 105° C. to 180° C. for several minutes through masses of steamed wet noodles which are continuously brought into a substantially sealed drying chamber, said superheated water vapor having been evolved from the interior of the steamed wet noodles in a boiling state, and heated by a heating means built in said drying chamber; and cooling the masses of dried noodles discharged from the drying chamber by an atmospheric air.

6 Claims, 4 Drawing Figures

4,271,205

METHOD FOR MANUFACTURING QUICKLY COOKABLE DRY AND POROUS NOODLES

CROSS REFERENCE TO THE RELATED APPLICATION

This application is a continuation-in-part of my copending patent application Ser. No. 964,295 filed Nov. 28, 1978, now abandoned, and assigned to the same assignee as the parent application.

BACKGROUND OF THE INVENTION

This invention relates to a method for manufacturing quickly cookable noodles, and particularly to a method for continuously manufacturing dry and porous noodles essensially consisting of alpha type starch. Noodles essencially consting of alpha type starch are referred generally as "alpha type noodles." Known methods for manufacturing quickly cookable dry noodles include, for example, (1) a process of directly drying masses of steamed noodles, that is, alpha type noodles, by hot air at 80° to 120° C. for about 60 to 30 minutes; (2) a process of drying masses of steamed noodles for long hours by warm air at 60° to 80° C.; and (3) a process of freezing masses of steamed noodles, followed by vacuum drying.

However, the process (1) has the drawbacks that scorch or discoloration tends to appear on the surface of dried noodles, and after drying hot air is wasted, resulting in a decline in thermal efficiency. The process (2) is not acceptable due to low productivity, because the drying process consumes a long time such as several hours, although the steamed noodles are little subject to scorch or discoloration. The process (3) is not adapted to a practical application due to very high production cost, although a high quality product can be obtained.

Hitherto, those skilled in the art have succeeded substantially alike in manufacturing excellent steamed noodles by applying a high quality raw material and devising the steps of kneading, rolling, cutting and steaming. Since, however, the last step of drying has not been fully improved, the following difficulties have still remained unsolved. Namely, the product loses visual attractiveness due to scorch or discoloration. Yield is liable to fall, because cracks in the dried noodles sometimes give rise to waste. Hot water cooking consumes a long period of time when the dried noodles serve as a cooked food.

SUMMARY OF THE INVENTION

It is accordingly the object of this invention to improve the final drying step of steamed noodles.

To this end, we conducted studies and discovered that these difficulties arise from the customary process of heating steamed noodles, thereby forcefully expelling the water which has been diffused to the surface layers of the steamed noodles. It was further disclosed that a long time was required for the drying of the surface of steamed noodles, whereby the water contained in said noodles was slowly diffused to the surface thereof; elevation of the drying temperature to accelerate the air-drying of noodles resulted in the appearance of scorch or discoloration on the surface thereof; and cracks occurred in the surface layers of the noodles due to the different degree of shrinkage of the upper and central portions of the interior of the noodles.

In view of the above-mentioned discovery, we attempted as a trial to heat an individual steamed noodle with care taken to avoid a decline in heating temperature of the surface of the noodles, and to raise the temperature of the interior thereof to a higher level than 100° C., thereby causing the water contained in the steamed noodles to be boiled off. When superheated steam at 120° C. was blown onto an individual steamed noodle continuously for about 7 to 8 minutes, heat was conducted to the interior of the individual noodle without a decline in heating temperature of the surface of the individual steamed noodle. It was found that the water contained in the interior of steamed noodles was quickly reduced by boiling, causing the individual dried noodle to expand and become porous. The method of this invention for continuously manufacturing improved dry and porous noodles of alpha-type has been accomplished on the basis of the principle mentioned above.

In brief, the method of this invention comprises blowing circulatingly superheated steam, which is evolved from the steamed noodles while they are heated, at 105° to 180° C. for 5 to 10 minutes under an atmospheric pressure at a velocity of 2 to 10 meters per second through masses of steamed noodles continuously brought into the substantially sealed drying chamber; and cooling the masses of noodles discharged therefrom by an atmospheric air.

BRIEF DESCRIPTION OF THE DRAWINGS

We will describe the method of this invention in detail by reference to the accompanying drawings, in which.

DETAILED DESCRIPTION OF THE INVENTION

Figure 1:
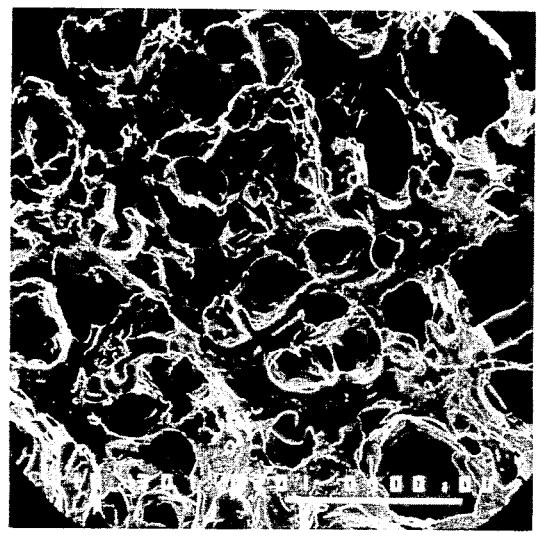
FIG. 1 is a 300-times magnified microscope photograph of a cross section of dry and porous noodle of alpha-type manufactured by a method according to this invention.

A mixture of wheat flour and other raw materials is kneaded to prepare a dough. The dough is rolled into a strip. The strip is cut into linear pieces to provide raw noodles. Steam is applied to the raw noodles to form alpha type noodles. The steamed noodles are cut to a prescribed length and gathered into a mass. The steps up to this point are the same as those customarily followed.

The masses of noodles thus prepared are continuously carried into a drying chamber by a net type air-permeable horizontal conveyor. The drying chamber should be substantially sealed except for the inlet and outlet ports for the motion of the conveyor to prevent free flow of open air into and out of said chamber. The prior art drying chamber never fails to be provided with a vent to prevent air in the drying chamber from being saturated with water vapor evolved from steamed noodles while they are dried. In contrast, the drying chamber in this invention need not be provided with a vent, because the drying chamber is to be purposely filled with water vapour released from steamed noodles during their drying.

At first, the masses of steamed noodles continuously pass through the drying chamber supported by a net type air-permeable horizontal conveyor. The air in the drying chamber is heated to a temperature of from 105° to 180° C. by a heating means positioned in the drying chember and is forcefully circulated therethrough by a blower positioned in said chamber onto and through the masses of steamed noodles. Then, water vapor evolved from the interior of the masses of steamed noodles progressively accumulates in the drying chamber, and the air which circulates in the drying chamber is replaced during a few minutes operation by the water vapor which is evolved from the interior of the steamed noodles and superheated by the heating means in a like manner as noted hereinbefore. Thereafter, the steamed noodles are dried by the superheated steam which is circulatingly blown by the blower onto and through the masses of steamed noodles for 5 to 10 minutes at atmospheric pressure.

Scorch or discoloration which occurs on the surface of individual noodle during the initial stage of operation in which hot air is applied ceases to appear when the superheated water vapor starts to circulate in the drying chamber. Water contained in the interior of the individual noodle is rapidly dried by the superheated water vapor i.e. superheated steam and boils off from the noodle, causing the individual noodle to be expanded with porousness. The water vapor excessively accumulated in the drying chamber is naturally drawn off from the small inlet and outlet ports for the continuous passing of the conveyor. The temperature of circulating water vapor through the drying chamber gradually falls accomanying with the drying of masses of steamed noodles. Therefore, it is necessary to replenish heat by a heating means built in the drying chamber in order to maintain the temperature of circulating water vapor, i.e. steam at the specified superheated level.

The water vapor i.e. steam, circulating through the drying chamber is generally preferred to have a temperature of from 105° C. to 180° C., which actually varies with the kind and shape of the steamed noodles and other associated conditions. If the circulating water vapor i.e. steam, has a lower temperature than 105° C., the individual noodle does not become satisfactorily porous and expanded. If the temperature rises about 180° C., the undesirable event occurs that the individual noodle expands irregularly. The velocity at which superheated water vapor is blown onto and through masses of steamed noodles is generally preferred to be 2 to 10 meters per second, which varies with the kind and shape of individual steamed noodle and other associated conditions. If the velocity is lower than 2 meters per second, the individual noodle does not fully expand with porousness. If the velocity is conversely higher than 10 meters per second, the individual noodle flies up or is blown off from the conveyor, causing the masses to be deformed.

After the drying of the masses of steamed noodles in the drying chamber in such a manner as mentioned above, the masses discharged continuously from the drying chamber are cooled in an atmospheric air. Then, each of the cooled masses is packed with suitable additives in a marketable form.

When the individual steamed noodle is dried to become porous and expanded by the method of this invention, it is not sufficient simply to bring the superheated water vapor into contact with the noodle, but is necessary forcefully to blow the superheated water vapor onto and through the noodle masses. The reason, therefore, follows. The method of this invention does not consist in removing water exuding from the interior to the surface of the noodle simply by evaporation. The purpose of this invention is to introduce a large amount of thermal energy into the interior of individual steamed noodle with care taken to avoid the untimely evaporation of water from the surface thereof and to boil away the water contained in the interior of the noodle in order to obtain a dry and porous noodle. Generally, the surface of individual steamed noodle is converted into a sort of paste, making it relatively difficult for water to be evaporated from said surface. This condition rather positively supports the method of this invention.

According to the method of this invention, masses of steamed noodles pass through the highly heated drying chamber for 5 to 10 minutes far more efficiently from the standpoint of drying than in the prior art drying chamber where steamed noodles are dried by hot air at 80° C. to 120° C. for 60 to 30 minutes as mentioned at first. Further advantage of this method is that the noodles dried by this method have a porous structure consisting of a large number of fine cells. Therefore, the noodles prepared by this method can be sufficiently cooked with poured boiling water to be served in as short a time as about 3 minutes after the boiling water is poured. Noodles thus treated are fluffy, yet agreeably tough and very delicious.

The individual noodle dried by superheated water vapor in accordance with this method has a surface saved from scorch or discoloration, and becomes lustrous and visually attractive. A further advantage of the noodles manufactured by the method of this invention is that the odor of the dough from which the noodles are formed completely disappears due to evaporation of water and gases from the interior thereof. Other merits of this method are that high thermal efficiency is ensured due to application of circulating superheated water vapor i.e. steam, and when dried in the drying chamber, noodles are not wasted by breakage resulting from local or irregular shrinkage.

When superheated water vapor is circulatingly blown onto and through masses of steamed noodles which run through the drying chamber by being carried on a net-type air-permeable conveyor, it is preferred to apply said water vapor from above to below the conveyor in the forward half section of the conveyor, and from below to above the conveyor in the rear half section thereof in order to effect uniform heating of the noodle masses. The reversed arrangement is also effective. In these cases, it is possible to build a plurality of conveyors one above another in the drying chamber and let noodle masses mounted on one conveyor fall on the adjacent conveyor at one end, thereby turning the noodle masses upside down, and under this condition the superheated water vapour passes repeatedly through the noodle masses.

This invention will be more fully understood by reference to the examples which follow.

EXAMPLE 1

Raw noodles provided by a customary process were steamed 2 minutes at 100° C. in order to manufacture non-fried noodles of alpha-type. The masses of steamed noodles were carried at the rate of 100 g per minute by being mounted on a horizontal net-type conveyor through a drying chamber 1 meter wide, 1.5 meters high and 20 meters long which was substantially sealed except for inlet and outlet ports for the conveyor. The conveyor was arranged to pass completely through the drying chamber in 6 minutes. At first, air at 125° C. was circulated at a velocity of 5.5 meters per second through the net-type conveyor from above to below in the forward half section of the conveyor and from below to above in the rear half section thereof.

During the first three minutes after the start of this drying operation, scorch or discoloration appeared on the surface of dried individual noodle. The air in the chamber was driven out from the ports of the chamber by the superheated water vapor of the same temperature as the above, which was evolved from the interior of the steamed noodles and heated by a heater arranged in the chamber. Then, the scorch or discoloration ceased to take place, providing dried masses of porous noodles containing about 7% by weight of water and having an alpha-conversion degree of 92%. The masses of porous noodles discharged from the drying chamber were cooled by atmospheric air, providing quickly cookable dry noodles. Because they are porous, the noodles are sufficiently cooked with boiling water in 3 minutes to be served, and proved very delicious due to the complete absence of dough odor.

FIG. 1 is a 300-times magnified microscopic photograph of a cross section of a dry and porous single noodle thus obtained, indicating the presence of a large number of fine roundish cells i.e. pores.

CONTROL 1

Figure 2:
FIG. 2 is a 300-times magnified microscopic photograph of a cross section of dry but nonporous noodle of alpha-type manufactured for comparison by a customary warm air-drying process.

Steamed noodles used in Example 1 were treated 40 minutes by the customarily applied dry hot air at 80° C. for one hour while being carried through a drying chamber provided with a vent. FIG. 2 is a 300-times magnified microscopic photograph of a cross section of one of the dried noodles thus obtained. In FIG. 2, it is impossible to observe numerous roundish cells, i.e. pores, like those of FIG. 1.

EXAMPLE 2

Figure 3:
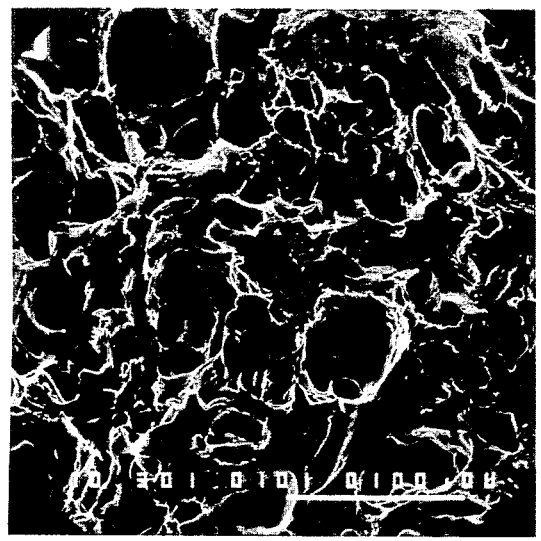
FIG. 3 is a 300-times magnified microscopic photograph of a cross section of dry and porous noodle of alpha-type manufactured by a method according to another embodiment of this invention.

Raw Japanese buckwheat noodles prepared by the customary process were steamed 2 minutes at 100° C. Dry hot air at 120° C. was initially blown for half an hour at a velocity of 5.5 meters per second onto and through masses of the steamed noodles in a drying chamber. Later as in Example 1, the noodles were dried 6 minutes by superheated water vapor i.e. steam of 120° C., which was evolved from the steam noodles and heated by a heater arrange in the chamber. After cooling, there were provided quickly cookable porous noodles having an alpha conversion degree of about 90% and containing about 6% by weight of water. FIG. 3 is a 300-times magnified microscopic photograph of a cross section of a single Japanese buckwheat dry noodles thus produced, in which numerous roundish fine cells are present.

CONTROL 2

Figure 4:
FIG. 4 is a 300-times magnified microscopic photograph of a cross section of dry but nonporous noodle manufactured for comparison by an ordinary drying process.

The steamed Japanese buckwheat noodles used in Example 2 were heated by the same manner as described in Control 1. FIG. 4 is a 300-times magnified similar microscopic photograph of the dry noodle obtained, in which no roundish cells can be seen.

What is claimed is:

1. A method for manufacturing dry and porous alpha-type noodles which can be cooked in about three minutes by boiling water which is poured into a container containing said dry and porous noodles comprising continuously passing masses of steamed wet noodles substantially horizontally into and through a substantially sealed drying chamber, blowing in said drying chamber superheated steam at a temperature of 105° C. to 180° C. at atmospheric pressure onto and through said masses of steamed wet noodles as said noodle masses pass through said drying chamber for 5 to 10 minutes, whereby water vapor is evolved in a boiling state from the interior of the steamed wet noodles thereby forming dry and porous noodles, and said evolved water vapor in a boiling state is heated and circulated in said chamber at a temperature of 105° C. to 180° C. to constitute said superheated steam; and discharging the dry and porous noodles from the substantially sealed drying chamber; and cooling the discharged dry and porous noodles in atmospheric air to provide said dry and porous alpha-type noodles.

2. The method of claim 1 wherein excess superheated steam in the drying chamber exits through the inlet and outlet ports through which the masses of noodles pass into and out of the drying chamber.

3. The method of claim 1 wherein the superheated steam is forcibly blown onto the masses of steamed wet noodles from above in the half of the drying chamber adjacent the inlet and is blown onto the masses of noodles from below in the half section of the drying chamber adjacent the outlet through which the dried and porous noodles exit.

4. The method of claim 1 wherein the superheated steam is blown onto the masses of raw noodles from below in the half of the drying chamber adjacent the inlet and blown onto the masses of noodles from above in the half section of the drying chamber adjacent the outlet through which the dried and porous noodles exit.

5. The method of claim 1 wherein the superheated steam is formed by heating the water vapor evolved from the noodles in the drying chamber to a temperature of 105° C. to 180° C. by a heating means positioned in said chamber and said superheated steam is forcibly circulated onto and through masses of steamed wet noodles.

6. The method of any one of claims 1, 2, 3, 4 or 5 wherein said superheated steam is directed onto said masses of steamed wet noodles by forcibly blowing the superheated steam at a rate of between 2 and 10 meters per second.

* * * * *